May 19, 1953  J. M. BARR  2,638,930
DIAPHRAGM
Filed Oct. 25, 1946

INVENTOR
John M. Barr
BY
ATTORNEY

Patented May 19, 1953

2,638,930

UNITED STATES PATENT OFFICE 2,638,930

DIAPHRAGM

John M. Barr, West Hartford, Conn., assignor, by mesne assignments, to Niles-Bement-Pond Company, West Hartford, Conn., a corporation of New Jersey Application October 25, 1946, Serial No. 705,587

6 Claims. (Cl. 137—793)

The present invention relates to differential pressure responsive diaphragms and methods of making such diaphragms.

Differential pressure responsive diaphragms are commonly made by taking a flat sheet of rubber impregnated fabric and molding it under high pressure to form an annular convolution. One or more rigid disc members are then attached to the central portion of the diaphragm inside the convolution, and one or more rigid annular members are attached to outer portion. When used in a differential pressure responsive mechanism for operating a valve, switch, or the like, the convolution permits movements of the central disc member relative to the annular member in a direction at right angles to the planes of those two members. If a differential pressure exists between the opposite sides of the diaphragm, it is moved by that differential pressure. If the diaphragm movement is opposed by a spring, the deflection of the spring may be used as a measure of the differential pressure.

In diaphragms of the prior art, which have been formed from a flat sheet of fabric with the threads running at right angles to each other, the threads cross the convolution at various angles. Since the threads have no relation to the contour of the convolution, the forming of the convolution in the fabric member results in stressing the threads unequally. These unequal internal stresses remain in the diaphragm member after it is formed. Such stresses introduce internal friction opposing motion of the diaphragm. Furthermore, such internal stresses cause wear within the diaphragm when it is subject to cycles of flexing and unflexing such as are commonly encountered in the use of differential pressure responsive devices.

It is therefore an object of the present invention to provide a flexible fabric diaphragm having an annular convolution, in which all the threads in the convolution run either radially across the convolution or circumferentially around the convolution.

Another object of the present invention is to provide a flexible diaphragm wherein the convolution is formed by telescoping within itself a section of fabric tubing.

A further object is to provide an improved method of forming a flexible fabric diaphragm having a convolution therein.

Figure 1:
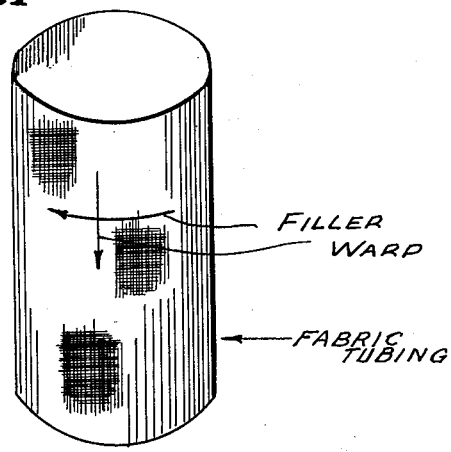
Figure 2:
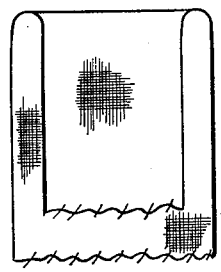
Figure 3:
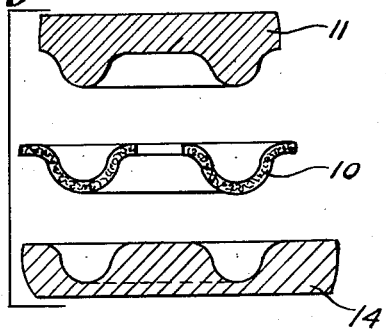
Figure 4:
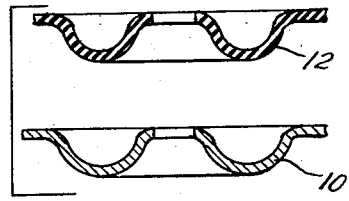
Figure 5:
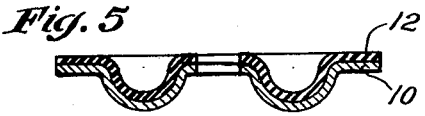
Figure 6:
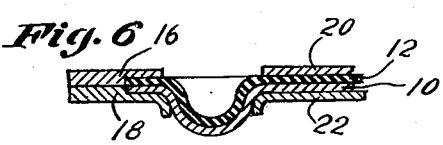
Figure 7:
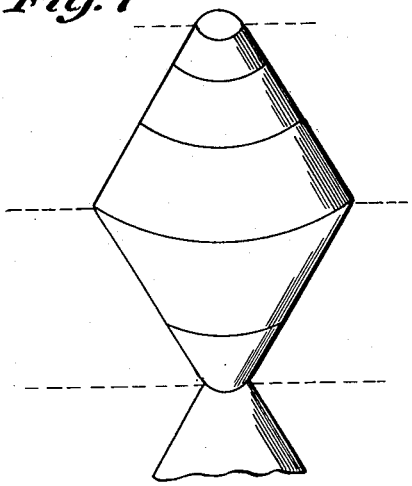

Other objects and advantages of the present invention will become apparent from a consideration of the appended specification, claims and drawing, in which Figure 1 represents a section of fabric tubing which is used to form the diaphragm convolution in accordance with my invention, Figure 2 shows a cross-sectional view of the tubing of Figure 1 after it has been telescoped within itself to form the convolution, Figure 3 shows the step of molding the convoluted fabric member to make the convolution permanent, Figure 4 illustrates the step of attaching a preformed rubber backing member to the convoluted fabric member, Figure 5 shows the convoluted fabric member with the rubber liner attached to it, Figure 6 shows the completed diaphragm of Figure 5 with rigid reinforcing plates attached to its central and annular portions, and Figure 7 shows a section of fabric tubing of gradually varying diameter, which may be used in the practice of my invention.

Referring to the drawings, in order to form a flexible diaphragm in accordance with my invention, I first take a section of fabric tubing, preferably seamless "nylon" tubing, as illustrated in Figure 1, having the warp threads running lengthwise of the tubing and the filler threads running circumferentially. I then telescope it upon itself as indicated in Figure 2 so as to form an annular fold or convolution. It should be noted that in this convolution, the threads run all either radially across the convolution or circumferentially around the convolution.

In Figure 3, there is shown a step in which a convoluted fabric member 10, which has been formed from the fabric tubing as shown in Figures 1 and 2, is molded to form a smooth, permanent convolution. Before the molding process, the fabric should be impregnated with rubber latex or some similar plastic substance. This may be done either before or after the folding step.

Where the word rubber is used in this specification and claims, it should be understood that it is meant to cover not only rubber but all rubberlike materials having similar properties.

After the convoluted fabric member has been telescoped upon itself as shown in Figure 2, and before said member is moulded into the form shown in Figure 3, the fabric is severed by cutting it in a plane at right angles with the longitudinal axis of the sleeve shown in Figure 2, and the (lower) severed portion of said fabric is removed from the (upper) convoluted portion. The convoluted portion is then inverted and placed upon the lower mold, of Figure 3, with the rounded part of the convolution resting in the annular groove in said mold, whereupon the annular rib of the upper mold of Figure 3 is registered with the space between the inner and outer walls of said severed convoluted portion. The upper and lower molds of Figure 3 are then pressed together, whereupon the outer and inner cylindrical wall parts of said convoluted portion are respectively spread outwardly and inwardly, until the said convoluted portion assumes the form shown in Figure 3. In severing the (upper) convoluted portion from the lower cylindrical portion of the sleeve shown in Figure 2, the distance of the cutting plane below the rounded upper end of the convoluted portion is such that the outer, overall, longitudinal length of said severed convoluted portion (Figure 2) is the same as the overall, radial length of the bottom surface of the molded form of said portion (Figure 3), between its inner and outer edges.

In Figure 3, the convoluted impregnated fabric diaphragm 10 is placed between a steel die 11 and a rubber mold 14. The die and mold are then pressed together and heated for a suitable period of time so as to cure the previously uncured rubber in the diaphragm and make the shape of the flexible member 10 permanent.

In Figure 4, the curved flexible member 10 is shown below a pre-formed rubber liner 12, which is shaped to conform with the fabric member 10.

In Figure 5, the fabric member 10 and the liner 12 have been bonded together to form a unitary flexible diaphragm, with the liner inside, so that in use the rubber will be forced against the fabric.

In Figure 6, annular reinforcing members 16 and 18 have been attached to opposite sides of the annular portion of the diaphragm outside the convolution. Also, reinforcing discs 20 and 22 have been attached to the central portion of the diaphragm inside the convolution.

By the use of a convolution formed in this manner, it may be seen that the threads of the fabric are stressed by the forming of the convolution only in the direction of their lengths and are not twisted. Also, all the warp threads are equally stressed and each filler thread is uniformly stressed along its length.

I have shown in Figure 7 another form of fabric tubing which may be used to form diaphragms. This type of fabric tubing is manufactured with a varying diameter so that its diameter increases over a certain length and then decreases over the same length. The use of fabric tubing such as that shown in Figure 7 aids particularly in the formation of the flat surfaces inside and outside the convolution, since the wide portion of the tubing is used to form the flat portion outside the convolution and the narrow portion of the tubing is used to form the flat portion inside the convolution. The tubing is cut into lengths as indicated by the dotted lines in the drawing, and the length between each pair of dotted lines is used to form one convoluted diaphragm.

The terms and expressions which I have employed are used as terms of description and not of limitation, and I have no intention, in the use of such terms and expressions, of excluding any equivalent of the features shown and described or portions thereof, but recognize that various modifications are possible within the scope of the invention claimed.

I claim as my invention:

1. A differential pressure responsive diaphragm, comprising a flexible annular member of seamless woven fabric having an annular convolution near its mid-portion with a substantial portion of the threads of said fabric extending radially, and the remaining threads extending circumferentially, of said convolution.

2. A differential pressure responsive diaphragm comprising an annular member of flexible, woven fabric impregnated with rubber and having an annular convolution with a substantial portion of the threads of said fabric extending radially, and the remaining threads extending circumferentially, of said convolution.

3. The method of forming a differential pressure responsive daiphragm, comprising the steps of telescoping a section of flexible, woven fabric tubing upon itself to form an annular convolution with some of the threads of said fabric extending radially and all of the remaining threads extending circumferentially of said convolution, impregnating said fabric tubing section with uncured rubber, and curing said rubber in a mold conforming to said convolution so that the impregnated fabric section will retain its convolute form.

4. The method of forming a differential pressure responsive diaphragm, comprising the steps of telescoping a section of flexible, woven fabric tubing upon itself to form an annular convolution with some of the threads of said fabric extending radially and all of the remaining threads extending circumferentially of said convolution, impregnating said fabric tubing section with uncured rubber, curing said rubber in a mold conforming to said convolution so that the impregnated fabric section will retain its convolute form, forming a rubber liner conforming to said convolution, and bonding said liner to said molded fabric section.

5. The method of forming a differential pressure responsive diaphragm, comprising the steps of telescoping a section of rubber impregnated flexible, woven fabric tubing upon itself to form an annular convolution with some of the threads of said fabric extending radially and all of the remaining threads extending circumferentially of said convolution, and molding said convoluted fabric section to make said convolution permanent.

6. A diaphragm according to claim 2, wherein all of said radially extending threads are equally stressed and each of said circumferentially extending threads is uniformly stressed.

JOHN M. BARR.

References Cited in the file of this patent

UNITED STATES PATENTS

| Number | Name | Date |
|---|---|---|
| 335,033 | Lock | Jan. 26, 1886 |
| 971,583 | Bell | Oct. 4, 1910 |
| 1,175,373 | Noack | Mar. 14, 1916 |
| 1,466,087 | Christenson | Aug. 28, 1923 |
| 1,610,173 | Slade | Dec. 7, 1926 |
| 1,734,470 | Kellogg | Nov. 5, 1929 |
| 1,790,206 | Farmer | Jan. 27, 1931 |
| 1,998,815 | MacDonald | Apr. 23, 1935 |
| 2,149,507 | Camfield | Mar. 7, 1939 |
| 2,178,953 | Chilton | Nov. 7, 1939 |
| 2,275,712 | Zand | Mar. 10, 1942 |
| 2,380,983 | Mock | Aug. 7, 1945 |
| 2,391,674 | Brown et al. | Dec. 25, 1945 |
| 2,478,575 | Fitch | Aug. 9, 1949 |